A. H. PEYCKE.
RELEASE SPRING CLIP.
APPLICATION FILED MAY 15, 1918.
1,325,533. Patented Dec. 23, 1919.
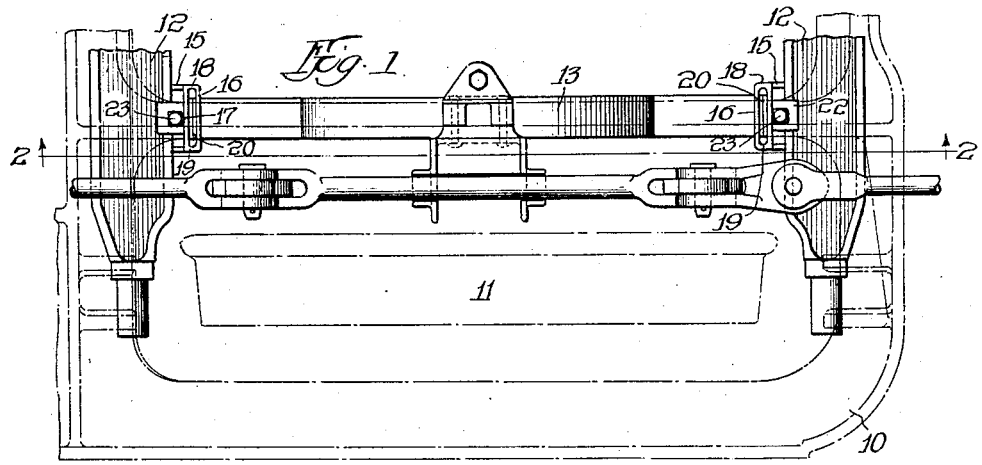
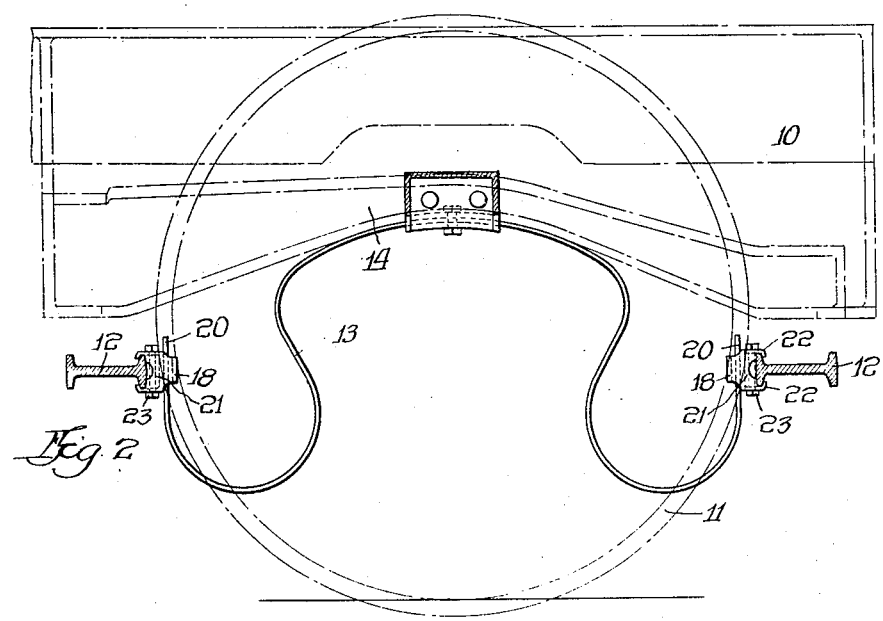
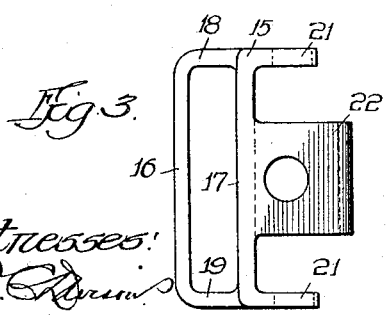
Witnesses:
Inventor
Armand H. Peycke,
By Wilkinson & Huxley
Attys.

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

RELEASE-SPRING CLIP.

1,325,533.  Specification of Letters Patent.  Patented Dec. 23, 1919.

Application filed May 15, 1918. Serial No. 234,577.

*To all whom it may concern:*

Be it known that I, ARMAND H. PEYCKE, a citizen of the United States, residing at Chicago, in the county of Cook and State of Illinois, have invented certain new and useful Improvements in Release-Spring Clips, of which the following is a specification.

This invention relates to release spring clips.

One of the objects of this invention is to prevent the brake release spring from directly engaging the associated brake beam.

Another object is to provide a release spring clip, adapted to meet the requirements for service conditions.

These and other objects are accomplished by means of the arrangement disclosed by the accompanying sheet of drawings, in which, Figure 1 is a fragmentary plan view of brake mechanism, embodying my invention.

Fig. 2 is a sectional view taken in the plane of line 2—2 of Fig. 1.

Fig. 3 is a detail plan view of my improved release spring clip, and

Fig. 4 is a detail side elevation of the same applied to a brake beam.

In the drawings I have shown a railway car truck 10 supported by wheels 11, only one of which is shown, on opposite sides of which are brake beams 12 for carrying brake heads with brake shoes (not shown).

A brake release spring 13 preferably secured to the wheel guard 14 loops downwardly and upwardly into operative association with the brake beams 12. It is a well established fact that it is a bad practice to have the release springs directly engage the brake beams for the reason that the beams become considerably worn. Various spring clips have been provided whereby the release springs engage the spring clips instead of the brake beams, but these spring clips have merely been in the form of wearing plates, which were adjustably mounted upon the brake beams. It has been found that these clips become loosened and slide along the brake beam, permitting the release springs to engage the brake beam and cause wear thereof. To overcome this objectionable feature I have provided a spring clip which at all times will hold the release spring out of engagement with the brake beam and definitely confine the release spring. This spring clip 15 takes the form of a member having four walls 16, 17, 18 and 19, forming a loop or inclosure for the reception of a free end portion 20 of the release spring. The spring clip also has four projecting members, two of them 21, having their end portions abutting the associated brake beam 12 and the other two 22 being in the form of hook members, which hook over the vertical flange of the brake beam. The clip is clamped to the brake beam by a suitable bolt and nut arrangement 23. When set in place, the end of the release spring is positively retained within the loop formed by the walls 16 to 19, inclusive, and is prevented from accidental removal whereby the release spring is prevented from engaging the brake beam. This is equally true even though the clip becomes loose on the brake beam. If the clip should slide along the brake beam after becoming loose the release spring will slide a given amount therewith. Naturally, however, the release spring will prevent the clip from moving very far. By means of the spring clip, the release spring is prevented at all times, from directly engaging the associated brake beam.

It is my intention to cover all modifications falling within the spirit and scope of the following claim:

I claim:

A brake release spring clip having two projections which abut a flange of an associated brake beam, two projections which hook over the flange for attachment, and a receiving and retaining portion for a release spring to prevent the latter from passing into engagement with the beam.

Signed at Chicago, Illinois, this 9th day of May, 1918.

ARMAND H. PEYCKE.